May 6, 1952
W. J. HORN
2,595,661
STACKING MACHINE
Filed July 25, 1949
3 Sheets-Sheet 1
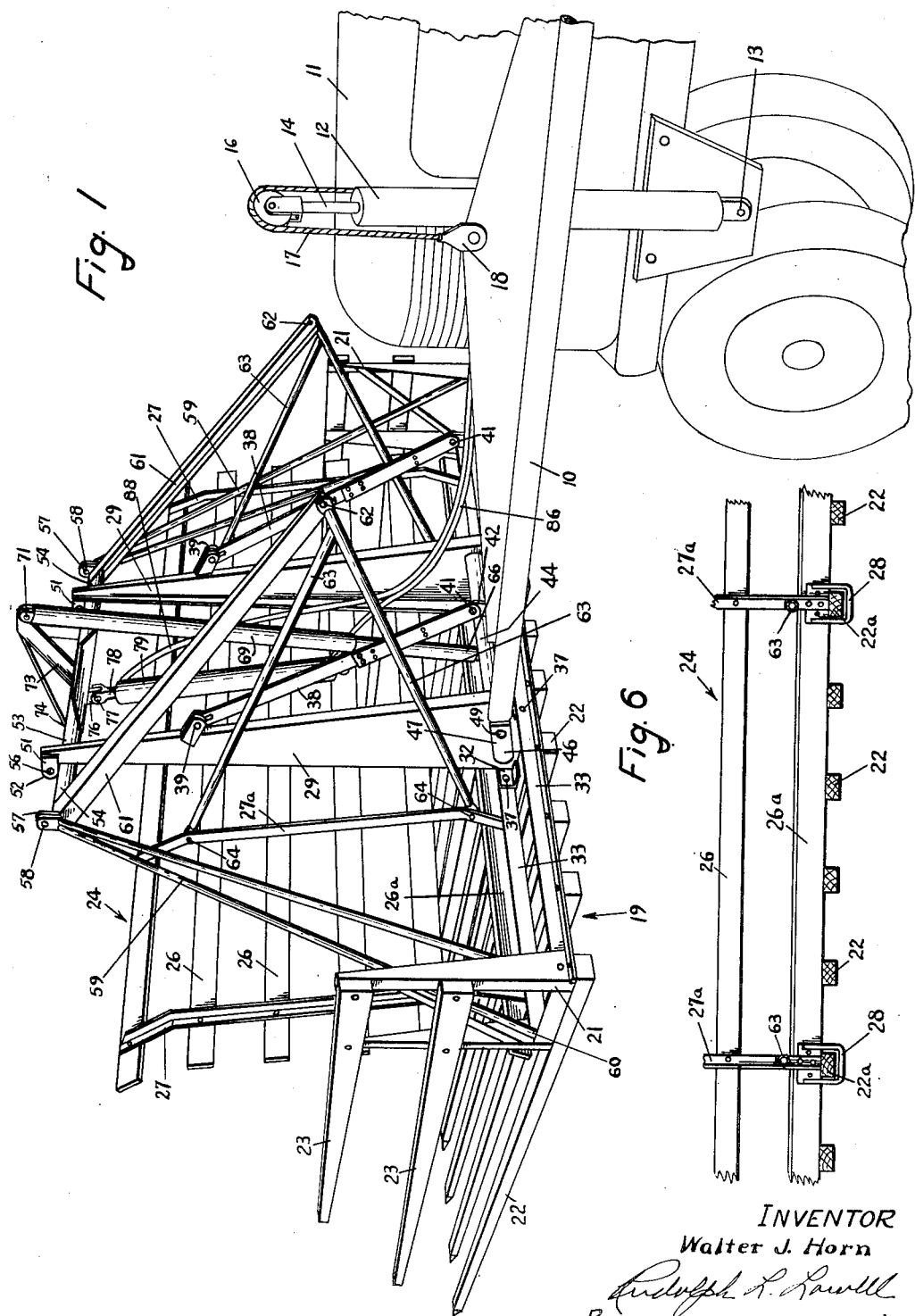
INVENTOR
Walter J. Horn
By Rudolph L. Lowell
att'y.

May 6, 1952 W. J. HORN 2,595,661
STACKING MACHINE
Filed July 25, 1949 3 Sheets-Sheet 2
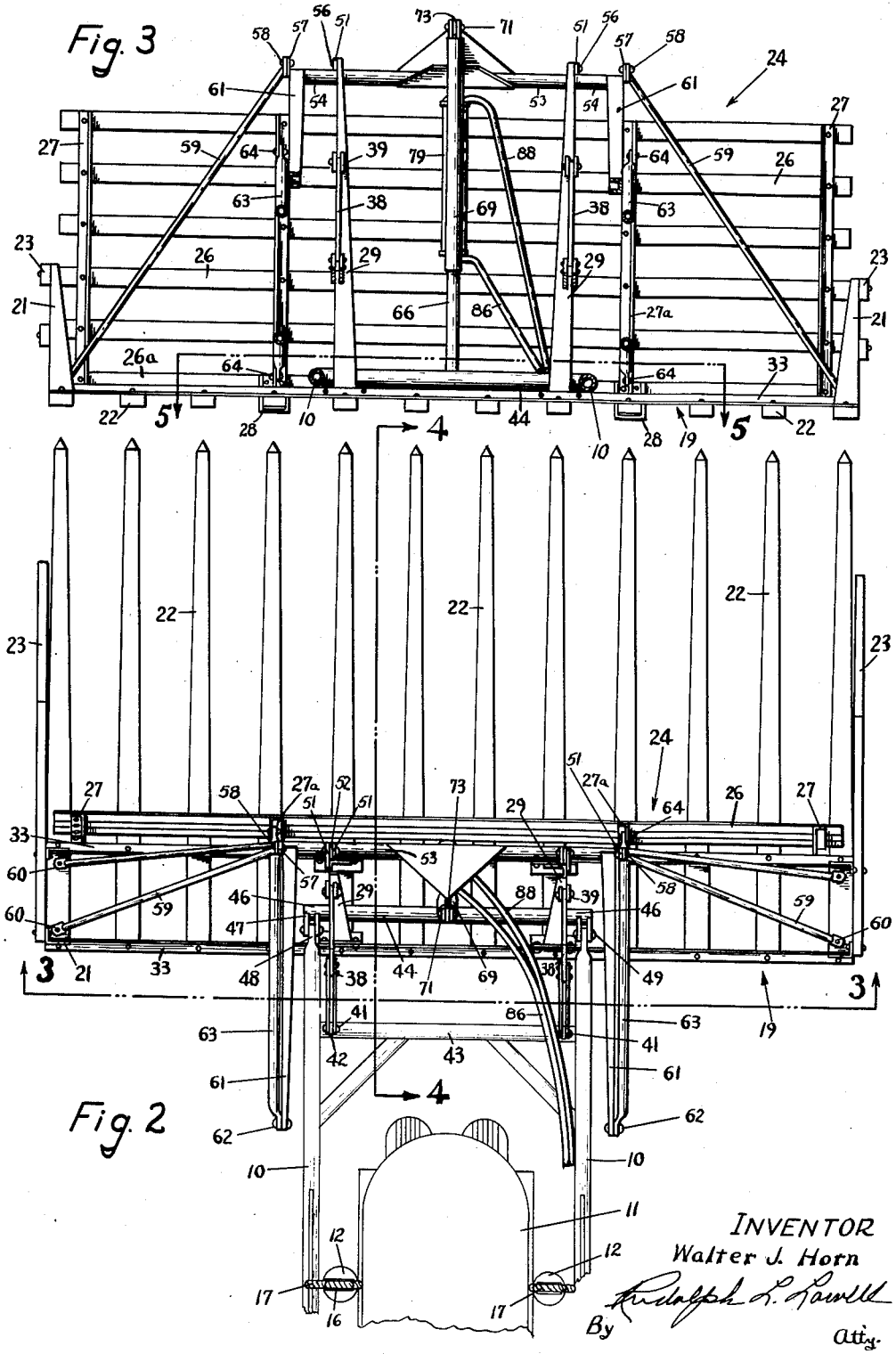

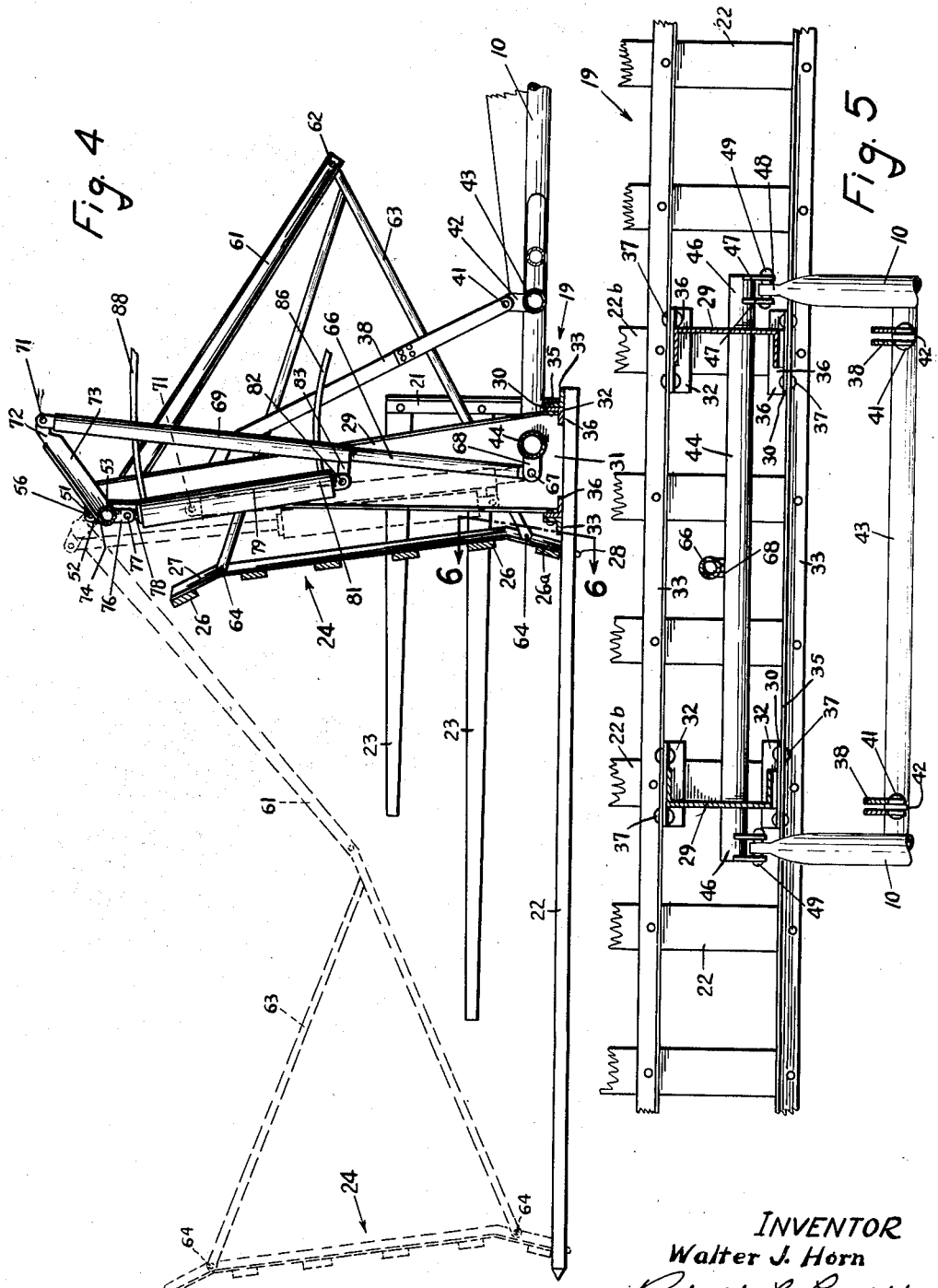

Patented May 6, 1952

2,595,661

UNITED STATES PATENT OFFICE 2,595,661

STACKING MACHINE

Walter J. Horn, Fort Dodge, Iowa, assignor to Horn Manufacturing Company, Fort Dodge, Iowa, a corporation of Iowa Application July 25, 1949, Serial No. 106,694

3 Claims. (Cl. 214—82)

This invention relates generally to loading machines and in particular to a push-off rake for a stacking machine.

An object of this invention is to provide an improved stacking machine.

A further object of this invention is to provide a stacking machine having a push-off rake in which a rear gate is hydraulically operated and adapted to be moved at a relatively fast rate of speed during a push-off operation.

Yet another object of this invention is to provide a push-off rake having a rear gate hydraulically operated through a leverage system such that the actuating force applied on the gate is a maximum at the initiation of movement of the gate for a pushing operation.

A still further object of this invention is to provide a push-off rake of a simple and compact construction and having a rear movable gate which is positive and efficient in operation, and readily and easily controlled.

A feature of this invention is found in the provision of a stacking machine having a push-off rake in which a transverse rock shaft is mounted at the rear end of the rake at a position substantially level with the top side of a rear gate supported on the rake for movement longitudinally thereof. A pair of rock arms on the shaft, swingable downwardly between rearwardly inclined and forwardly inclined positions, have their free ends pivoted to the rear ends of Y-shape arms extended rearwardly from the gate. A double acting hydraulic cylinder, for rocking the shaft, is connected to the shaft through a double leverage system which provides for a maximum leverage action on the gate to initiate its push-off movement, a rapid movement of the gate to its push-off position, and a positive leverage action to initiate the return movement of the gate.

Further objects, features, and advantages of this invention will become apparent from the following description when taken in connection with the accompanying drawings, in which:

Fig. 1 is a rear perspective view of the push-off rake of this invention shown in assembly relation with the lift arms of a tractor-loader attachment;

Fig. 2 is a plan view of the assembly shown in Fig. 1;

Fig. 3 is a transverse sectional view as seen on the line 3—3 in Fig. 2;

Fig. 4 is a longitudinal sectional view taken on the line 4—4 in Fig. 2;

Fig. 5 is an enlarged sectional view as seen on the line 5—5 in Fig. 3; and

Fig. 6 is a foreshortened sectional view as taken along the line 6—6 in Fig. 4.

With reference to the drawings the push-off rake of this invention is illustrated in Figs. 1 and 2 in assembly relation with a pair of booms or lift arms 10, which are arranged at opposite sides of a tractor 11. The rear ends (not shown) of the arms 10 are pivotally supported on the tractor to provide for a pivotal up and down movement of the arms. The lift mechanism for raising and lowering the arms 10 includes a pair of oppositely arranged hydraulic cylinders 12, corresponding to the arms 10, and pivotally mounted at 13 on the tractor 11. The cylinder pistons 14 carry pulleys 16 at their outer or upper ends for movably supporting cables 17, each of which is attached at one end 18 to a corresponding lift arm 10, and secured at its opposite end (not shown) to the tractor. Fluid under pressure is supplied to the cylinders 12 from a pump unit (not shown) mounted on and operated by the tractor.

The push-off rake of this invention includes a main frame or base of an angle iron construction and indicated generally as 19. The frame 19 is of a substantially rectangular shape and is provided at its opposite ends with pairs of upright supports 21 spaced transversely of the frame 19 or longitudinally of the rake. Suitably secured to the lower side of the frame 19 are a plurality of spaced bottom tines 22 having their front ends projected forwardly from the base 19. Side tines 23 are mounted upon and extended forwardly from the upright supports 21.

A push-off or rear gate, designated generally as 24 (Figs. 1 and 4), includes a plurality of vertically spaced flat board members 26 positioned transversely of the rake and mounted on upright angle members 27, illustrated in Fig. 2 as being four in number. The lower board member 26a of the rear gate 24 (Fig. 6) rests on the top sides of the bottom tines 22 to slidably support the gate 24 for movement longitudinally of the rake between positions defined by the front ends of the tines 22 and the forward side of the main frame or base 19. The push-off gate 24 (Fig. 6) is guidably maintained against movement transversely of the rake by the provision of U-shaped guides 28 secured to the lower board 26a at positions at the lower ends of the center angle uprights indicated at 27a, with the guides 28 being projected downwardly from the board 26a and of a size to loosely receive the bottom tines indicated at 22a.

To move the gate 24 longitudinally of the rake, there is provided an upright frame located rearwardly of the gate 24 and comprised of a pair of side members 29 tapered inwardly toward their upper ends and of a generally channel shape in transverse cross section (Figs. 1, 4 and 5). The upright members 29 are located centrally of the main frame 19 in a longitudinally spaced relation and are provided at opposite sides of their lower ends 31 with angle base plates 32. The lower ends 31 of the upright frame members 29 are of a width corresponding substantially to the distance between the side members 33 of the main frame 19 so as to be receivable therebetween, with corresponding vertical legs 30 and 35 on the base plates 32 and side members 33, respectively, in a back to back relation. The horizontal legs 36 of the base plates 32 rest on the top sides of the bottom tines, indicated at 22b, and the corresponding upright legs 30 and 35 of the base plates 32 and side members 33, are secured together as by bolts 37.

Adjustable brace members 38 (Fig. 1) are connected at 39, adjacent the upper ends of the upright members 29, while their lower ends are connected at 41 to upright projections 42 on a transverse brace 43 connected between the forward ends of the lift arms 10. A transverse tubular frame member 44 (Figs. 4 and 5) is extended through the lower ends 31 of the upright members 29 so that its opposite ends 46 project laterally outwardly from the members 29.

Each projected end 46 of the tubular frame member 44 carries a pair of rearwardly extended longitudinally spaced lugs 47 adapted to receive therebetween a front end 48 of a lift arm 10. The lift arms 10 are connected with the lugs 47 by bolts 49 extended therethrough. It is seen, therefore, that the push-off rake is maintained against tipping movement relative to the arms 10 by a three-point supporting action comprising the opposite end connections of the adjustable braces 38 and the lift arm connection 49.

Each upright member 29 (Figs. 1 and 4) has at its upper end a pair of transversely spaced forwardly extended projections 51 for receiving therebetween a corresponding upright projection 52 carried on a transverse rock shaft 53, the opposite ends 54 of which project laterally outwardly from the upright members 29. The projections 51 and 52 are pivotally connected at 56 so that the shaft 53 on rocking movement in a clockwise direction, as viewed in Fig. 4, is also moved forwardly and upwardly relative to the upright frame members 29.

Each end 54 of the rock shaft 53 (Fig. 1) has an upright projection 57 which is pivotally connected at 58 with the upper end of a brace member 59, having its lower end 60 suitably secured to an end frame 21 of the main frame 19. The pivots 58 and 56 are in axial alignment longitudinally of the rock shaft 53 to provide for its free swinging movement relative to the upright frame members 29.

Mounted at opposite ends of the tubular rock shaft 53 (Figs. 1 and 3) are a pair of rock arms 61 of a substantially channel shape in transverse cross section, with the arms being arranged relative to the rock shaft 53 so as to be swingable downwardly from rearwardly inclined positions to forwardly inclined positions as the rock shaft is moved forwardly and upwardly on its pivot supports 56 and 58. The free ends of the rock arms 61 are pivotally connected at 62 with the rear ends of Y-shape arm structures 63, the forward ends of which structures are connected at 64 at vertically spaced positions on the center upright angles 27a. It is thus seen that the rock arms 61 and Y-arm structures 63 comprise articulated arm systems which are movable to forwardly extended or open positions, and to rearwardly closed or collapsed positions in response to the rocking movement of the shaft 53, as will later appear.

The rock shaft 53 is actuated by means including an upright guide member 66 of a rod construction (Figs. 1, 3 and 4) located intermediate the upright frame members 29 and having its lower end pivoted at 67 between a pair of projections 68 extended forwardly from the tubular frame member 44. Slidably supported on the guide member 66 for up and down movement is a sleeve or slide member 69 of a tubular construction, the upper end of which is pivotally connected at 71 with the free end 72 of a lever 73, the opposite end 74 of which is mounted on the rock shaft 53. A second lever 76, mounted on the rock shaft 53, in a vertical plane common to the lever 73, has its free end pivoted at 77 to the outer or upper end of a double acting piston 78 operatively associated with an upright cylinder 79. The lower end 81 of the cylinder 79 is pivotally supported at 82 on a forward projection 83 carried adjacent the lower end of the slide member 69.

The rock shaft levers 73 and 76 are in a vertical plane extended longitudinally of the rake unit and constitute a bell crank member integrally formed with the rock shaft 73, with the lever 73 being of a longer length than the lever 76. As best appears in Fig. 4, when the rock arms 61 and arm structures 63 are in their rearwardly folded positions, the gate 24 is in its rear-most or normal position adjacent the front side member 33 of the main frame 19. At this position of the gate 24 the piston 78 is retracted within the cylinder 79 and the slide member 69 is in its outer-most position extended upwardly relative to the guide rod 66. With the slide member 69 extended, the long lever arm 73 is inclined upwardly and rearwardly from the rock shaft 53, while the shorter lever arm 76 is extended substantially vertically downward from the rock shaft.

In the operation of the push-off rake of this invention, assume the gate 24 to be in its rest or normal position, as shown in full lines in Fig. 4. On the supply of fluid under pressure to the lower end of the cylinder 79 through a fluid conduit 86 which is suitably connected with the oil-supply unit mounted on the tractor 11, the cylinder 79 is initially moved downward relative to the piston 78, as a result of the downward projection of the lever arm 76. In other words, when the lever arm 76 is in its full-line position shown in Fig. 4, the pivots 56 and 77 are in substantially a common vertical plane extended through the longitudinal axis of the rock shaft 53. As a result, the lever 76 is substantially locked against upward movement in response to any pressure applied thereon by the piston 78. The downward movement of the cylinder 79 in turn provides for a downward movement of the slide member 69, whereby the cylinder pressure is applied through the member 69 and long lever 73 on the rock shaft 53 to rock the same about its pivots 56 and 58.

As a result, a maximum leverage action is applied on the shaft 53 to initiate the forward movement of the gate 24 from its full-line rest position in Fig. 4 to its push-off position, shown in dotted lines in the same figure. Further, the initial rocking movement of the shaft 53, in a clockwise direction as seen in Fig. 4, moves the pivot connection 77 of the piston 78 with the lever 76 forwardly out of vertical alignment with the pivots 56 and 58, whereby to release the piston 78 for extension from the cylinder 79. Thus after movement of the gate 24 has been initiated, its continued movement to a push-off position takes place by the leverage action of both of the levers 73 and 76. This push-off position of the gate 24 is defined by a fully extended position of the piston 78 relative to the cylinder 79.

With the piston 78 fully extended, and as illustrated in Fig. 4, the rock arms 61 are inclined forwardly and downwardly from the rock shaft 53 and the arm structures 63 are projected forwardly from the rock arms 61. Further, it will be noted that the lever arm 73 is extended substantially vertically downward from the rock shaft 53, while the shorter lever arm 76 is inclined upwardly and forwardly from the rock shaft 53.

To return the gate 24 from its push-off position to its rest position adjacent the main frame 19, fluid under pressure is supplied to the upper end of the cylinder 79 through a fluid conduit 88. Since the lever 73 is in substantial longitudinal alignment with the slide member 69 and guide member 66, this return movement of the gate 24 is initiated primarily by the leverage action of the shorter lever 76 on the rock shaft 53. It is to be noted that this leverage action of the short lever 76 is complemented by the leverage action of the upright projections 52, through which the shaft 53 is pivoted at 56 on the upright frame members 29.

After the return movement of the gate 24 has been initiated, the levers 73 and 76 act concurrently to rock the shaft 53 in a counter-clockwise direction, as viewed in Fig. 4, with the leverage action of the lever 76 becoming progressively less, and the action of the lever 73 progressively greater, as the gate 24 approaches its rest position.

It is seen, therefore, that the movement of the gate 24 from its rest position to its push-off position is initiated primarily by the action of the lever 73, and with the action of the lever 73 to move the gate 24 being progressively decreased as the gate approaches its push-off position. However, with a decrease in the action of the lever 73 on the shaft 53, there is a corresponding increase in the action of the lever 76 on the rock shaft, so that the gate 24 is positively moved to its push-off position, and with its approach to such position being at a slower rate relative to its previous rate of movement on the tines 22.

Conversely, the rate of return movement of the gate 24, as initiated by the lever 76, is less than its rate of movement as provided by the action of the lever 73, after the lever 73 has been moved rearwardly from its position in substantial alignment with the slide member 69.

Since the supply of fluid under pressure to the conduits 86 and 88 to the double acting cylinder 79 is accomplished through a simple finger actuated valve control (not shown), the movement of the gate 24 longitudinally of the tines 22 is conveniently and simply accomplished, and with this movement being both positive and relatively fast by virtue of the complementary action of the levers 73 and 76. It is further apparent that the assembly of the rake unit on the lift arms 19 is capable of being easily made by one man and, after adjustment of the braces 38 has been made, consists only in handling the bolt connections 39 and 41. Adjustment of the brace members 38 provides for a tipping movement of the front ends of the tines 22 to positions substantially six inches below a level or horizontal position of the tines, to a position about three inches above a horizontal position of the tines. The adjustment or tilt of the tines 22 is determined from the kind of material to be handled by the rake unit.

Further, it is to be understood that in the loading of the rake unit, the gate 24 is in its rest or normal position shown in full lines in Fig. 4. The rake is then filled by a usual bucking operation, after which the loaded rake is elevated to a desired position by the operation of the lift arms 10, and while in such elevated position, the gate 24 is moved to its push-off position to unload the rake.

Although the invention has been described with respect to a preferred embodiment thereof, it is to be understood that it is not to be so limited since changes can be made therein which are within the full intended scope of this invention, as defined by the appended claims.

I claim:

1. In a stacking machine including a push off rake, an upright push gate movably supported for movement longitudinally of said rake, means for moving said push gate including an upright frame on said rake located rearwardly of the push gate, a rock shaft on said upright frame having a pair of rock arms at opposite ends thereof, a pair of rearwardly extended arms on said push gate having their rear ends pivoted to the free ends of said rock arms, an upright guide rod pivoted at its lower end on said rake, a sleeve member movable on said guide rod, a first lever fixed at one end on said rock shaft, means pivotally connecting the other end of said first lever with said sleeve, an upright hydraulic cylinder pivotally supported at its lower end on said sleeve, a piston for said cylinder, and a second lever on said rock shaft pivotally connected at its free end to the outer end of said piston.

2. In a stacking machine, a push-off rake including a rear gate movable longitudinally of said rake, a transverse rock shaft supported on said rake rearwardly of said gate at a position adjacent the upper end thereof, a pair of downwardly extended rock arms on said rock shaft movable to opposite sides of a vertical plane through the axis of said rock shaft, a pair of rearwardly extended arms on said gate having their rear ends pivoted to the free ends of said rock arms, means for rocking said shaft to move said gate including an upright slide member, means supporting said slide member for up and down movement, an upright cylinder pivotally supported at its lower end on said slide member, a piston for said cylinder, a pair of levers mounted on said rock shaft in a substantially common vertical plane, with one of said levers being longer than the other lever, said levers being relatively arranged such that when said rock arms are extended downwardly and rearwardly the longer lever is inclined upwardly and rearwardly and the shorter lever is extended downwardly, means pivotally connecting the free end of said shorter lever with said piston, and other means pivotally connecting the free end of said longer lever with said slide member.

3. In a stacking machine, a push off rake including a rear gate movable longitudinally of said rake, a transverse rock shaft supported on said rake rearwardly of said gate, a rearwardly extended rock arm on said shaft, means movably connecting the free end of said rock arm with said gate, means for rocking said shaft to move said gate including a slide member, means guiding said slide member for up and down movement, an upright cylinder pivotally supported at its lower end on said slide member, a piston for said cylinder, a pair of levers mounted on said rock shaft in a substantially common vertical plane, means pivotally connecting one of said levers with said piston, and other means pivotally connecting the other of said levers with said slide member.

WALTER J. HORN.

REFERENCES CITED

The following references are of record in the file of this patent:

UNITED STATES PATENTS

| Number | Name | Date |
| --- | --- | --- |
| 2,397,045 | Richey | Mar. 19, 1946 |
| 2,397,046 | Richey | Mar. 19, 1946 |
| 2,418,661 | Palm | Apr. 8, 1947 |
| 2,496,039 | Crawford | Jan. 31, 1950 |
| 2,497,385 | Young et al. | Feb. 14, 1950 |